US011614022B2

(12) United States Patent
Honjo et al.

(10) Patent No.: US 11,614,022 B2
(45) Date of Patent: Mar. 28, 2023

(54) VEHICLE TEMPERATURE ADJUSTMENT SYSTEM

(71) Applicant: HONDA MOTOR CO., LTD., Tokyo (JP)

(72) Inventors: Takuya Honjo, Tokyo (JP); Tomoyo Honjo, Tokyo (JP); Takumi Sato, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/573,225

(22) Filed: Jan. 11, 2022

(65) Prior Publication Data

US 2022/0220884 A1  Jul. 14, 2022

(30) Foreign Application Priority Data

Jan. 13, 2021 (JP) .............................. JP2021-003824

(51) Int. Cl.
| | | |
|---|---|---|
| *F01P 7/14* | (2006.01) | |
| *F01P 5/12* | (2006.01) | |
| *F01P 3/18* | (2006.01) | |
| *F02D 41/02* | (2006.01) | |
| *F01P 11/14* | (2006.01) | |

(52) U.S. Cl.
CPC ........ *F01P 7/14* (2013.01); *F01P 3/18* (2013.01); *F01P 5/12* (2013.01); *F01P 11/14* (2013.01); *F02D 41/021* (2013.01); *F01P 2007/146* (2013.01)

(58) Field of Classification Search
CPC ........ F01P 7/14; F01P 11/15; F01P 5/12; F01P 2007/146
See application file for complete search history.

(56) References Cited

U.S. PATENT DOCUMENTS

| 5,149,260 A | * | 9/1992 | Foust .................... F23D 11/386 431/11 |
| 6,201,365 B1 | | 3/2001 | Hara et al. |
| 6,323,613 B1 | | 11/2001 | Hara et al. |
| 6,340,006 B1 | * | 1/2002 | Malatto .................... F01P 3/00 123/41.29 |

(Continued)

FOREIGN PATENT DOCUMENTS

JP    2001-238406 A    8/2001

*Primary Examiner* — Long T Tran
(74) *Attorney, Agent, or Firm* — Paratus Law Group, PLLC

(57) ABSTRACT

A second temperature adjustment medium branches and flows into the first branch flow path and the second branch flow path at the branching portion, the second temperature adjustment medium and the second temperature adjustment medium are merged at the merging portion and flow through the pressure feed flow path to be supplied to the first pump, and the second temperature adjustment medium circulates through the second temperature adjustment circuit. A valve device configured to adjust a flow rate of the second temperature adjustment medium flowing through the second branch flow path is provided in the second branch flow path between the branching portion and the heat exchanger. The control device is configured to control the valve device to block the second temperature adjustment medium from flowing through the second branch flow path when a failure of the heat exchanger is detected.

5 Claims, 4 Drawing Sheets

(56) References Cited

U.S. PATENT DOCUMENTS

| | | | | |
|---|---|---|---|---|
| 6,971,585 | B2* | 12/2005 | Johnson | F24D 18/00 |
| | | | | 60/624 |
| 9,169,801 | B2* | 10/2015 | Mehring | F02F 7/00 |
| 2013/0156548 | A1* | 6/2013 | Takano | F25B 31/004 |
| | | | | 415/114 |
| 2016/0258343 | A1* | 9/2016 | Mushiga | F01P 7/164 |
| 2018/0119827 | A1* | 5/2018 | Ozeki | F16K 27/065 |
| 2020/0063640 | A1* | 2/2020 | Lee | F01P 7/16 |
| 2020/0088088 | A1* | 3/2020 | Lee | F01P 7/165 |

\* cited by examiner

VEHICLE TEMPERATURE ADJUSTMENT SYSTEM

CROSS-REFERENCE TO RELATED APPLICATIONS

This application is based on and claims priority under 35 USC 119 from Japanese Patent Application No. 2021-003824 filed on Jan. 13, 2021.

TECHNICAL FIELD

The present disclosure relates to a vehicle temperature adjustment system to be mounted on an electric vehicle or the like.

BACKGROUND ART

In related art, there has been known a vehicle including a rotary electric machine and an electric power conversion device which controls the rotary electric machine, such as an electric vehicle. In general, since the rotary electric machine and the electric power conversion device generate heat when driven, a vehicle temperature adjustment system which adjusts a temperature of the rotary electric machine and the power conversion device is mounted on a vehicle including the rotary electric machine and the power conversion device.

For example, JP-A-2001-238406 discloses a vehicle temperature adjustment system including: a circulation path L through which oil circulates and which cools an electric motor M; a circulation path F through which cooling water circulates and which cools an inverter U; and a heat exchange unit (oil cooler C) which performs heat exchange between the cooling water flowing through the circulation path F and the oil flowing through the circulation path L. A radiator R is provided in the circulation path F, and the cooling water flowing through the circulation path F is cooled by the radiator R. The oil flowing through the circulation path L is cooled by the heat exchange between the cooling water flowing through the circulation path F and the oil flowing through the circulation path L in the heat exchange unit (oil cooler C). In the vehicle temperature adjustment system in JP-A-2001-238406, since a radiator for cooling the oil is not necessary, the cooling water flowing through the circulation path F and the oil flowing through the circulation path L can be cooled by one radiator, thereby miniaturizing the vehicle temperature adjustment system.

On the other hand, in the vehicle temperature adjustment system in JP-A-2001-238406, when the heat exchange unit (oil cooler C) fails and is damaged, the cooling water, which flows through the circulation path F and cools the inverter U, flows into the circulation path L, and the cooling water may be mixed into the oil which cools the electric motor M.

Further, in the vehicle temperature adjustment system in JP-A-2001-238406, when the cooling water is mixed into the oil which cools the electric motor M, the oil containing the cooling water is supplied to the electric motor M. Since the water has conductivity, a short circuit may occur in the electric motor M when the oil containing the cooling water is supplied to the electric motor M.

SUMMARY

The present disclosure provides a vehicle temperature adjustment system that can reduce mixing of a conductive temperature adjustment medium into a non-conductive temperature adjustment medium.

According to an aspect of the present disclosure, there is provided a vehicle temperature adjustment system, including:
a first temperature adjustment circuit through which a first temperature adjustment medium circulates and in which a first pump is provided, the first temperature adjustment medium being non-conductive;
a second temperature adjustment circuit through which a second temperature adjustment medium circulates and in which a second pump is provided, the second temperature adjustment medium being conductive;
a heat exchanger configured to perform heat exchange between the first temperature adjustment medium and the second temperature adjustment medium; and
a control device, in which:
the second temperature adjustment circuit includes:
a branching portion and a merging portion;
a pressure feed flow path in which the second pump is provided, of which one end portion is connected to the branching portion, and of which the other end portion is connected to the merging portion;
a first branch flow path in which a temperature-adjusted device is provided, of which one end portion is connected to the branching portion, and of which the other end portion is connected to the merging portion; and
a second branch flow path in which the heat exchanger is provided, of which one end portion is connected to the branching portion, and of which the other end portion is connected to the merging portion;
the second temperature adjustment medium pressure-fed by the first pump and flowing through the pressure feed flow path branches and flows into the first branch flow path and the second branch flow path at the branching portion, the second temperature adjustment medium flowing through the first branch flow path and the second temperature adjustment medium flowing through the second branch flow path are merged at the merging portion and flow through the pressure feed flow path to be supplied to the first pump, and the second temperature adjustment medium circulates through the second temperature adjustment circuit;
a valve device configured to adjust a flow rate of the second temperature adjustment medium flowing through the second branch flow path is provided in the second branch flow path between the branching portion and the heat exchanger; and
the control device is configured to control the valve device to block the second temperature adjustment medium from flowing through the second branch flow path when a failure of the heat exchanger is detected.

According to an aspect according to the present disclosure, there is provided a vehicle temperature adjustment system, including:
an internal combustion engine:
a first temperature adjustment circuit through which a first temperature adjustment medium circulates and in which a first pump is provided, the first temperature adjustment medium being non-conductive;
a second temperature adjustment circuit through which a second temperature adjustment medium circulates and in which a second pump is provided, the second temperature adjustment medium being conductive;
a heat exchanger configured to perform heat exchange between the first temperature adjustment medium and the second temperature adjustment medium; and
a control device, in which:
the first pump is driven by power of the internal combustion engine; and the control device is configured to control the internal combustion engine to prohibit the driving of the internal combustion engine from being stopped when a failure of the heat exchanger is detected.

According to an aspect to the present disclosure, there is provided a vehicle temperature adjustment system, including:

a first temperature adjustment circuit through which a first temperature adjustment medium circulates and in which a first pump is provided, the first temperature adjustment medium being non-conductive;

a second temperature adjustment circuit through which a second temperature adjustment medium circulates and in which a second pump is provided, the second temperature adjustment medium being conductive;

a heat exchanger configured to perform heat exchange between the first temperature adjustment medium and the second temperature adjustment medium; and a control device, in which:

the second pump is an electric pump configured to be controlled by the control device; and the control device is configured to control the second pump such that a rotation speed of the second pump when a failure of the heat exchanger is detected is lower than a rotation speed of the second pump when a failure of the heat exchanger is not detected.

According to the present disclosure, even when the heat exchanger fails, it is possible to reduce mixing of the conductive second temperature adjustment medium into the non-conductive first temperature adjustment medium due to the second temperature adjustment medium flowing into the first temperature adjustment circuit in the heat exchanger.

DESCRIPTION OF EMBODIMENTS

Figure 1:
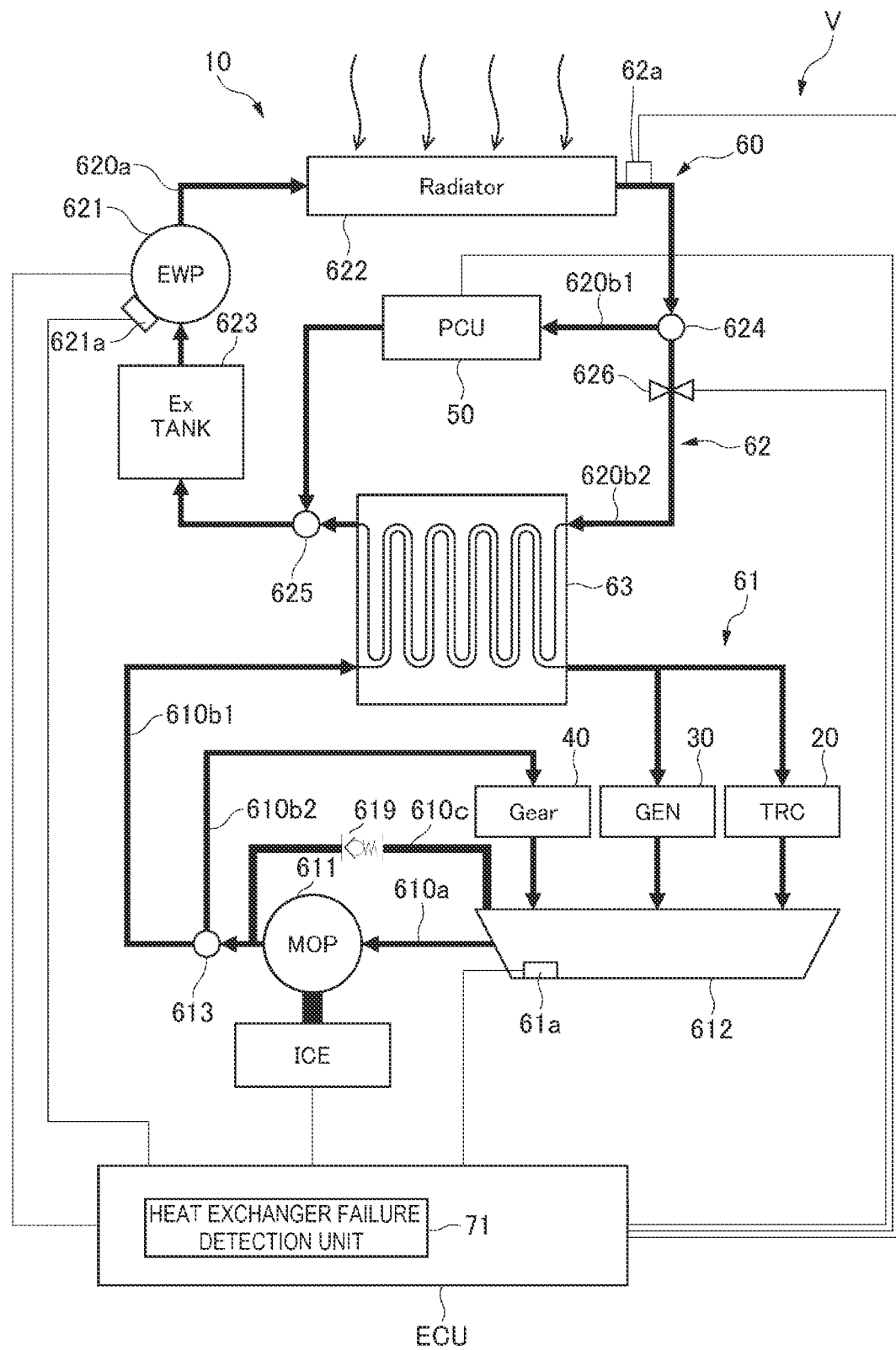
FIG. 1 is a block diagram illustrating a vehicle temperature adjustment system according to a first embodiment of the present disclosure.

Hereinafter, embodiments of a vehicle on which a vehicle temperature adjustment system according to the present disclosure is mounted will be described with reference to the accompanying drawings. It should be noted that the drawings are viewed in a direction of reference numerals.

First Embodiment

First, a vehicle temperature adjustment system 10 according to a first embodiment of the present disclosure will be described with reference to FIGS. 1 to 3.

As illustrated in FIG. 1, the vehicle temperature adjustment system 10 according to the present embodiment is mounted on a vehicle V, and includes an internal combustion engine ICE, a control device ECU, an electric motor 20, a power generator 30, a transmission device 40, an electric power conversion device 50, and a temperature adjustment circuit 60.

The electric motor 20 is a rotary electric machine which outputs power for driving the vehicle V using electric power stored in an electric storage device (not illustrated) mounted on the vehicle V or electric power generated by the power generator 30. When the vehicle V is braked, the electric motor 20 may generate electric power by kinetic energy of drive wheels of the vehicle V to charge the electric storage device described above.

The power generator 30 is a rotary electric machine which generates electric power by the power of the internal combustion engine ICE, charges the electric storage device described above, or supplies electric power to the electric motor 20.

The transmission device 40 is a device, such as a gear-type power transmission device, reducing a speed of the power output from the electric motor 20 and transmitting the speed-reduced power to the drive wheels.

The electric power conversion device 50 includes a power drive unit (PDU) (not illustrated) which converts the electric power output from the electric storage device described above from a direct current to an alternating current to control input and output power of the electric motor 20 and the power generator 30, and a voltage control unit (VCU) (not illustrated) which boosts the electric power output from the electric storage device described above as necessary. The VCU may step down the electric power generated by the electric motor 20 when the electric motor 20 generates the electric power in a case where the vehicle V is braked.

The temperature adjustment circuit 60 includes: a first temperature adjustment circuit 61 through which a non-conductive first temperature adjustment medium TCM1 circulates and which adjusts temperature of the electric motor 20, the power generator 30, and the transmission device 40; a second temperature adjustment circuit 62 through which a conductive second temperature adjustment medium TCM2 circulates and which adjusts a temperature of the electric power conversion device 50; and a heat exchanger 63 which performs heat exchange between the first temperature adjustment medium TCM1 and the second temperature adjustment medium TCM2. The non-conductive first temperature adjustment medium TCM1 is, for example, oil which is called automatic transmission fluid (ATF), can lubricate the electric motor 20, the power generator 30, and the transmission device 40, and can adjust the temperature thereof. The conductive second temperature adjustment medium TCM2 is, for example, cooling water which is called long life coolant (LLC).

The first temperature adjustment circuit 61 is provided with a first pump 611 and a storage unit 612. The first pump 611 is a mechanical pump driven by the power of the internal combustion engine ICE and a rotational force of an axle (not illustrated) of the vehicle V. The storage unit 612 stores the first temperature adjustment medium TCM1 circulating through the first temperature adjustment circuit 61. The storage unit 612 is, for example, an oil pan provided at a bottom of a housing (not illustrated) in which the electric motor 20, the power generator 30, and the transmission device 40 are housed. The first temperature adjustment circuit 61 includes a branching portion 613. The first temperature adjustment circuit 61 includes: a pressure feed flow path 610a in which the first pump 611 is provided, of which an upstream end portion is connected to the storage unit 612, and of which a downstream end portion is connected to the branching portion 613 through the first pump 611; a first branch flow path 610*b*1 in which the electric motor 20 and the power generator 30 are provided, of which an upstream end portion is connected to the branching portion 613, and of which a downstream end portion is connected to the storage unit 612 through the electric motor 20 and the power generator 30; and a second branch flow path 610*b*2 in which the transmission device 40 is provided, of which an upstream end portion is connected to the branching portion 613, and of which a downstream end portion is connected to the storage unit 612 through the transmission device 40. In the first temperature adjustment circuit 61, the heat exchanger 63 is disposed upstream of the electric motor 20 and the power generator 30 in the first branch flow path 610*b*1.

Therefore, in the first temperature adjustment circuit 61, a flow path in which the first temperature adjustment medium TCM1 pressure-fed from the first pump 611 is cooled by the heat exchange with the second temperature adjustment medium TCM2 in the heat exchanger 63 through the first branch flow path 610*b*1 from the branching portion 613, is supplied to the electric motor 20 and the power generator 30 to lubricate the electric motor 20 and the power generator 30 and adjust the temperature thereof, and then is stored in the storage unit 612, and a flow path in which the first temperature adjustment medium TCM1 pressure-fed from the first pump 611 is supplied to the transmission device 40 through the second branch flow path 610*b*2 from the branching portion 613 to lubricate the transmission device 40 and adjust the temperature thereof, and then is stored in the storage unit 612 are formed in parallel. The first temperature adjustment medium TCM1 stored in the storage unit 612 flows through the pressure feed flow path 610*a* and is supplied to the first pump 611, and the first temperature adjustment medium TCM1 circulates through the first temperature adjustment circuit 61.

In the present embodiment, the first branch flow path 610*b*1 and the second branch flow path 610*b*2 are formed such that a flow rate of the first temperature adjustment medium TCM1 flowing through the first branch flow path 610*b*1 is larger than a flow rate of the first temperature adjustment medium TCM1 flowing through the second branch flow path 610*b*2.

The first temperature adjustment circuit 61 is provided with a first temperature sensor 61*a* which detects a temperature of the first temperature adjustment medium TCM1 circulating through the first temperature adjustment circuit 61. In the present embodiment, the first temperature sensor 61*a* is provided in the storage unit 612, which is an oil pan, and detects the temperature of the first temperature adjustment medium TCM1 stored in the storage unit 612. The first temperature sensor 61*a* outputs a detection value of the temperature of the first temperature adjustment medium TCM1 stored in the storage unit 612 to the control device ECU.

The first temperature adjustment circuit 61 further includes a pressure adjustment circuit 610*c* of which an upstream end portion is connected to the storage unit 612, and of which a downstream end portion is connected to the pressure feeding flow path 610*a* on a downstream side of the first pump 611. The pressure adjustment circuit 610*c* is provided with a pressure adjustment valve 619. The pressure adjustment valve 619 may be a check valve or an electromagnetic valve such as a solenoid valve. When the liquid pressure of the first temperature adjustment medium TCM1 pressure-fed from the first pump 611 is equal to or higher than a predetermined upper limit pressure, the pressure adjustment valve 619 is opened, and a part of the first temperature adjustment medium TCM1 pressure-fed from the first pump 611 is returned to the storage unit 612. Accordingly, the liquid pressure of the first temperature adjustment medium TCM1 flowing through the first branch flow path 610*b*1 and the second branch flow path 610*b*2 is held to be equal to or lower than the upper limit pressure.

The second temperature adjustment circuit 62 is provided with a second pump 621, a radiator 622, and a storage tank 623. The second pump 621 is, for example, an electric pump which is driven by the electric power stored in the electric storage device. The radiator 622 is disposed at a front portion of the vehicle V, and is a heat dissipation device which cools the second temperature adjustment medium TCM2 by traveling wind when the vehicle V is traveling. The storage tank 623 is a tank in which the second temperature adjustment medium TCM2 circulating through the second temperature adjustment circuit 62 is temporarily stored. Even when cavitation occurs in the second temperature adjustment medium TCM2 circulating through the second temperature adjustment circuit 62, the cavitation occurred in the second temperature adjustment medium TCM2 disappears because the second temperature adjustment medium TCM2 circulating through the second temperature adjustment circuit 62 is temporarily stored in the storage tank 623.

The second temperature adjustment circuit 62 includes a branching portion 624 and a merging portion 625. The second temperature adjustment circuit 62 includes a pressure feed flow path 620*a* in which the storage tank 623, the second pump 621, and the radiator 622 are provided in this order from an upstream side, of which an upstream end portion is connected to the merging portion 625, and of which a downstream end portion is connected to the branching portion 624 through the storage tank 623, the second pump 621, and the radiator 622. The second temperature adjustment medium TCM2 stored in the storage tank 623 is pressure-fed by the second pump 621 through the pressure feed flow path 620*a*, and is cooled by the radiator 622.

The second temperature adjustment circuit 62 further includes: a first branch flow path 620*b*1 in which the electric power conversion device 50 is provided, of which an upstream end portion is connected to the branching portion 624, and of which a downstream end portion is connected to the merging portion 625 through the electric power conversion device 50; and a second branch flow path 620*b*2 in which the heat exchanger 63 is provided, of which an upstream end portion is connected to the branching portion 624, and of which a downstream end portion is connected to the merging portion 625 through the heat exchanger 63. In the present embodiment, a valve device 626 is provided in a portion of the second branch flow path 620*b*2 upstream of the heat exchanger 63. In the present embodiment, the valve device 626 may be an ON-OFF valve which switches the second branch flow path 620*b*2 between a fully open state and a fully closed state, or may be a variable flow rate valve which can adjust a flow rate of the second temperature adjustment medium TCM2 flowing through the second branch flow path 620*b*2. The valve device 626 is controlled by the control device ECU.

Therefore, the second temperature adjustment medium TCM2 pressure-fed by the second pump 621 and cooled by the radiator 622 in the pressure-feed flow path 620*a* branches into the first branch flow path 620*b*1 and the second branch flow path 620*b*2 at the branching portion 624. The second temperature adjustment medium TCM2 flowing through the first branch flow path 620*b*1 cools the electric power conversion device 50 and is merged with the second branch flow path 620b2 and the pressure feeding flow path 620a at the merging portion 625. The second temperature adjustment medium TCM2 flowing through the second branch flow path 620b2 cools the first temperature adjustment medium TCM1 by exchanging heat with the first temperature adjustment medium TCM1 in the heat exchanger 63, and is merged with the first branch flow path 620b1 and the pressure feed flow path 620a at the merging portion 625. The second temperature adjustment medium TCM2 flowing through the first branch flow path 620b1 and the second temperature adjustment medium TCM2 flowing through the second branch flow path 620b2 are merged at the merging portion 625, flow through the pressure feed flow path 620a, and are temporarily stored in the storage tank 623. Then, the second temperature adjustment medium TCM2 stored in the storage tank 623 is supplied again to the second pump 621 through the pressure feed flow path 620a, and the second temperature adjustment medium TCM2 circulates through the second temperature adjustment circuit 62.

In the present embodiment, the first branch flow path 620b1 and the second branch flow path 620b2 are formed such that the flow rate of the second temperature adjustment medium TCM2 flowing through the first branch flow path 620b1 is larger than the flow rate of the second temperature adjustment medium TCM2 flowing through the second branch flow path 620b2.

The second temperature adjustment circuit 62 is provided with a second temperature sensor 62a which detects a temperature of the second temperature adjustment medium TCM2 circulating through the second temperature adjustment circuit 62. In the present embodiment, the second temperature sensor 62a is provided in the pressure feed flow path 620a between the radiator 622 and the branching portion 624, and detects the temperature of the second temperature adjustment medium TCM2 discharged from the radiator 622. The second temperature sensor 62a outputs a detection value of the temperature of the second temperature adjustment medium TCM2 discharged from the radiator 622 to the control device ECU.

In the first temperature adjustment circuit 61, the temperature of the first temperature adjustment medium TCM1 stored in the storage unit 612 after cooling the electric motor 20, the power generator 30, and the transmission device 40 is about 100[° C.]. Therefore, the first temperature adjustment medium TCM1 of about 100[° C.] is supplied to the heat exchanger 63.

Meanwhile, in the second temperature adjustment circuit 62, a temperature of the second temperature adjustment medium TCM2 cooled by the radiator 622 is about 40[° C.]. Since the second temperature adjustment medium TCM2 supplied to the heat exchanger 63 does not pass through the electric power conversion device 50 which is a temperature-adjusted device, the second temperature adjustment medium TCM2 of about 40[° C.] is supplied to the heat exchanger 63.

The heat exchanger 63 performs heat exchange between the first temperature adjustment medium TCM1 of about 100[° C.] and the second temperature adjustment medium TCM2 of about 40[° C.] which are supplied to the heat exchanger 63. Then, the first temperature adjustment medium TCM1 of about 80[° C.] is discharged from the heat exchanger 63 to a downstream side of the first branch flow path 610b1 of the first temperature adjustment circuit 61, and the second temperature adjustment medium TCM2 of about 70[° C.] is discharged from the heat exchanger 63 to a downstream side of the second branch flow path 620b2 of the second temperature adjustment circuit 62.

In this way, since the first temperature adjustment medium TCM1 is cooled in the heat exchanger 63, the temperature adjustment circuit 60 can cool the first temperature adjustment medium TCM1 without providing a radiator for cooling the first temperature adjustment medium TCM1. Therefore, since the temperature adjustment circuit 60 can cool the first temperature adjustment medium TCM1 flowing through the first temperature adjustment circuit 61 and the second temperature adjustment medium TCM2 flowing through the second temperature adjustment circuit 62 by one radiator 622, the temperature adjustment circuit 60 can be miniaturized.

The control device ECU controls the internal combustion engine ICE, the electric power conversion device 50, the second pump 621, and the valve device 626. The control device ECU includes a heat exchanger failure detection unit 71 which detects a failure of the heat exchanger 63. A rotational speed sensor 621a which detects a rotational speed of the second pump 621 is attached to the second pump 621. The rotational speed sensor 621a outputs a detection value of the rotational speed of the second pump 621 to the control device ECU.

The heat exchanger failure detection unit 71 detects a failure of the heat exchanger 63 based on the detection value of the rotation speed of the second pump 621 output from the rotation speed sensor 621a.

Figure 2:
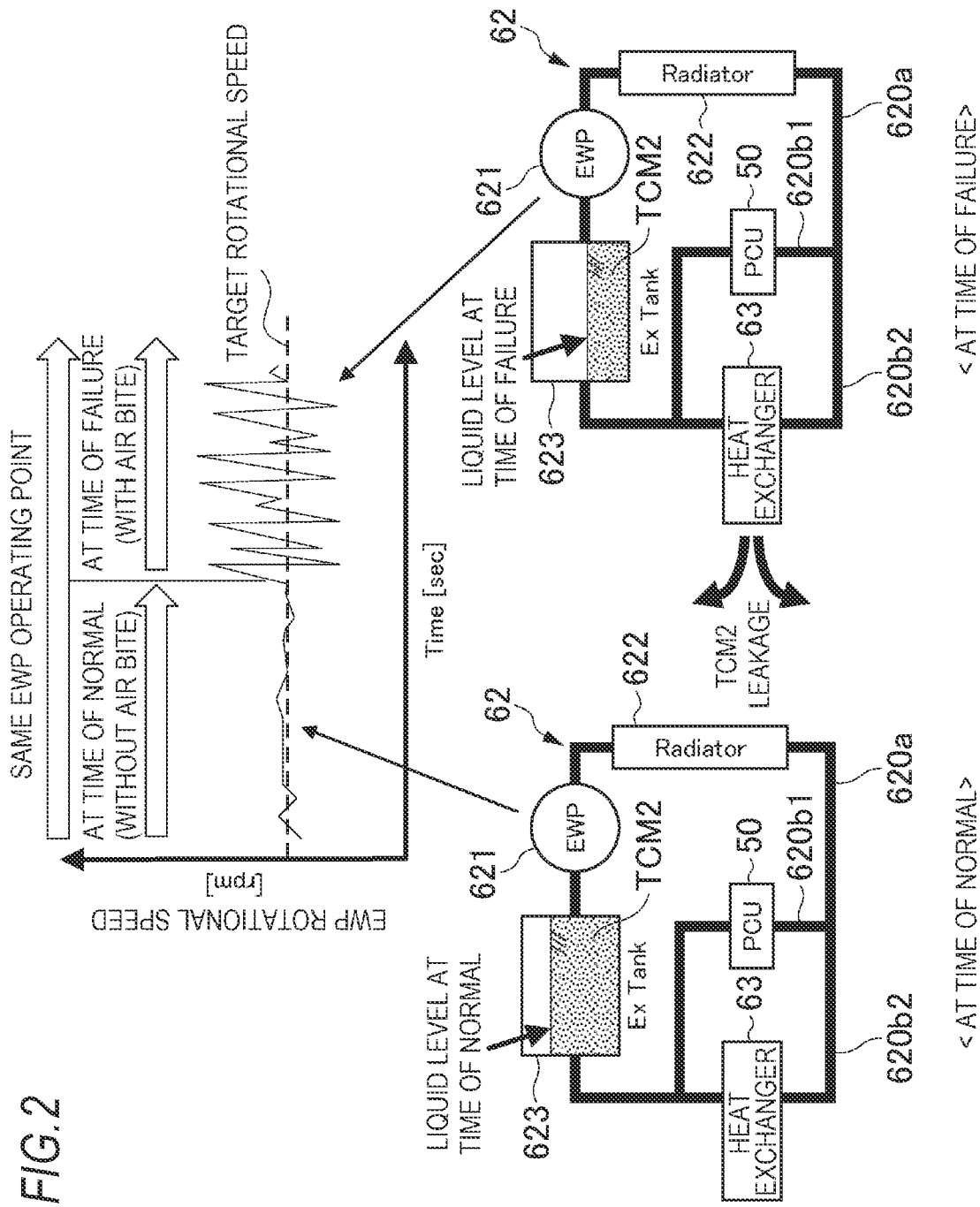
FIG. 2 is a diagram illustrating behavior of a rotational speed of a second pump in a case where a heat exchanger does not fail and in a case where the heat exchanger fails in the vehicle temperature adjustment system in FIG. 1.

As illustrated in FIG. 2, when the heat exchanger 63 fails and the second temperature adjustment medium TCM2 leaks from the second temperature adjustment circuit 62, the second temperature adjustment medium TCM2 stored in the storage tank 623 is decreased. When the liquid level of the second temperature adjustment medium TCM2 in the storage tank 623 is decreased to a level lower than an upper end of the pressure feed flow path 620a, air is mixed into the second temperature adjustment medium TCM2 discharged from the storage tank 623 to the pressure feed flow path 620a. When the second temperature adjustment medium TCM2 mixed with air is supplied to the second pump 621, a fluctuation range of the rotation speed of the second pump 621 with respect to a target rotation speed is larger than that in the case where the second temperature adjustment medium TCM2 not mixed with air is supplied. Therefore, when the fluctuation range of the detection value of the rotation speed of the second pump 621 output from the rotation speed sensor 621a with respect to the target rotation speed is equal to or greater than a predetermined value, it can be estimated that the second temperature adjustment medium TCM2 mixed with air is supplied to the second pump 621, the heat exchanger 63 fails, and the second temperature adjustment medium TCM2 leaks from the second temperature adjustment circuit 62.

As a result, it is possible to detect a failure of the heat exchanger 63 with a simple configuration, and thus it is possible to reduce the size of the vehicle temperature adjustment system 10.

Returning to FIG. 1, the heat exchanger failure detection unit 71 detects a failure of the heat exchanger 63 based on the detection value of the rotation speed of the second pump 621 output from the rotation speed sensor 621a. Specifically, the heat exchanger failure detection unit 71 detects the failure of the heat exchanger 63 by determining that the heat exchanger 63 has failed when the fluctuation range of the detection value of the rotation speed of the second pump 621 output from the rotation speed sensor 621a with respect to the target rotation speed is equal to or greater than the predetermined value.

When the heat exchanger failure detection unit 71 detects a failure of the heat exchanger 63, the control device ECU controls the valve device 626 so as to fully close the valve device 626 and block the second temperature adjustment medium TCM2 from flowing through the second branch flow path 620$b$2.

When the valve device 626 is fully closed to block the second temperature adjustment medium TCM2 from flowing through the second branch flow path 620$b$2, the second temperature adjustment medium TCM2 is not supplied to the heat exchanger 63. Therefore, when a failure of the heat exchanger 63 is detected, the second temperature adjustment medium TCM2 is not supplied to the heat exchanger 63, and therefore, even when the heat exchanger 63 fails and is damaged, it is possible to reduce mixing of the conductive second temperature adjustment medium TCM2 into the non-conductive first temperature adjustment medium TCM1 due to the second temperature adjustment medium TCM2 flowing into the first temperature adjustment circuit 61 in the heat exchanger 63.

Figure 3:
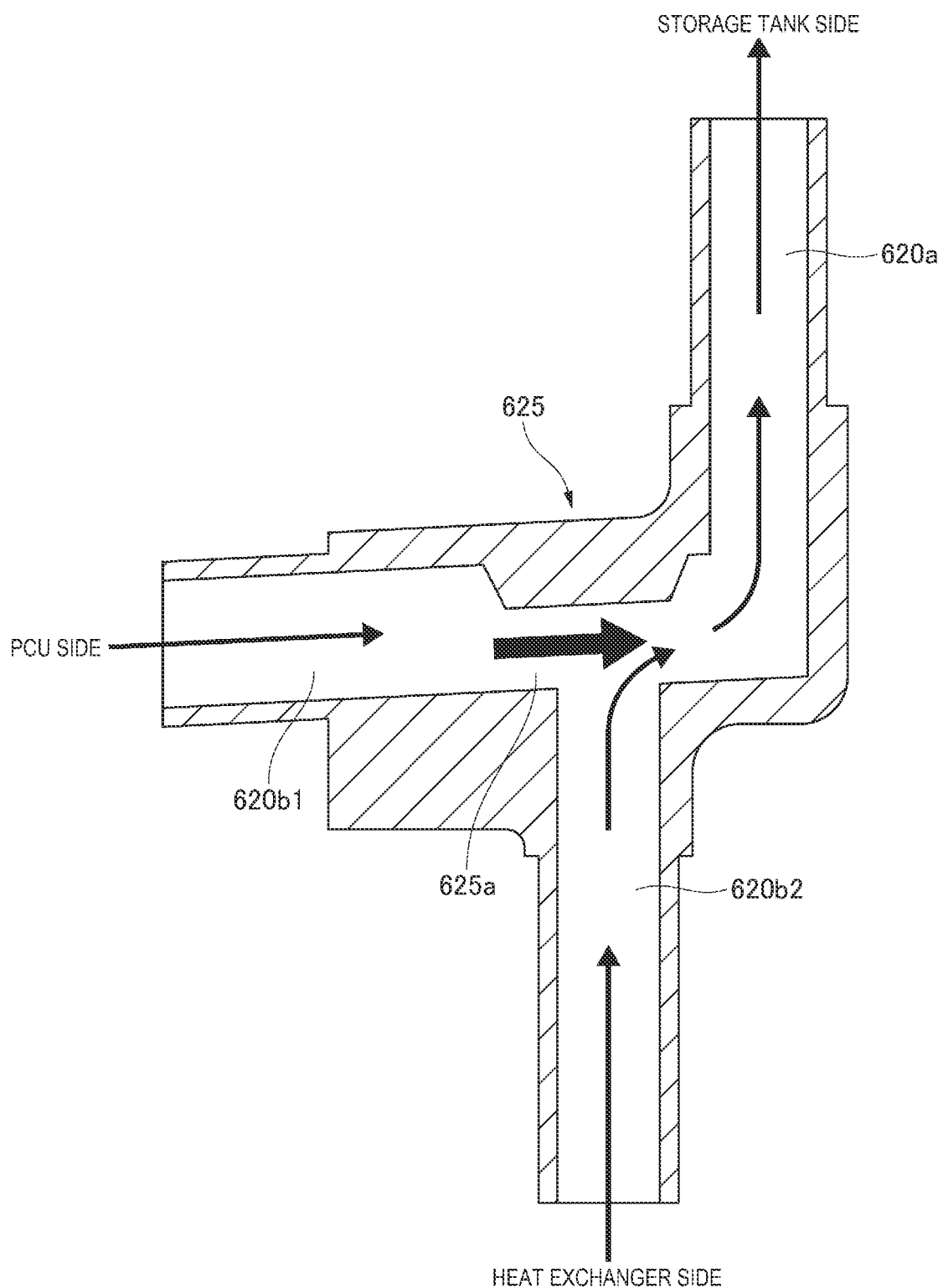
FIG. 3 is a view illustrating the vicinity of a merging portion of the vehicle temperature adjustment system in FIG. 1.

As illustrated in FIG. 3, a downstream end portion of the first branch flow path 620$b$1, a downstream end portion of the second branch flow path 620$b$2, and an upstream end of the pressure feed flow path 620$a$ are merged at the merging portion 625. Arrows illustrated in FIG. 3 indicate the flow direction of the second temperature adjustment medium TCM2.

In the merging portion 625, a throttle portion 625$a$ having a reduced flow path cross-sectional area is formed at the downstream end portion of the first branch flow path 620$b$1. The downstream end portion of the second branch flow path 620$b$2 is connected to the first branch flow path 620$b$1 by the throttle portion 625$a$.

A flow velocity of the second temperature adjustment medium TCM2 flowing from the downstream end portion of the first branch flow path 620$b$1 to the pressure feed flow path 620$a$ is increased, and a pressure is decreased due to a Venturi effect at the throttle portion 625$a$ having a reduced flow path cross-sectional area. Therefore, in the second temperature adjustment medium TCM2 flowing through the throttle portion 625$a$ from the first branch flow path 620$b$1 to the pressure feed flow path 620$a$, a suction force for sucking the second temperature adjustment medium TCM2 flowing through the second branch flow path 620$b$2 to the throttle portion 625$a$ is generated. By this suction force, a failure of the heat exchanger 63 is detected, and after the second temperature adjustment medium TCM2 is blocked from flowing through the second branch flow path 620$b$2 by the valve device 626, the second temperature adjustment medium TCM2 staying in the heat exchanger 63 is sucked to the throttle portion 625$a$ and is guided to the pressure feed flow path 620$a$. Accordingly, a failure of the heat exchanger 63 is detected, and it is possible to reduce the second temperature adjustment medium TCM2 staying in the heat exchanger 63 after the valve device 626 blocks the second temperature adjustment medium TCM2 from flowing through the second branch flow path 620$b$2, and thus it is possible to further reduce the mixing of the conductive second temperature adjustment medium TCM2 into the non-conductive first temperature adjustment medium TCM1 due to the second temperature adjustment medium TCM2 flowing into the first temperature adjustment circuit 61 in the heat exchanger 63.

Returning to FIG. 1, when the first temperature adjustment medium TCM1 is ATF, a viscosity of the first temperature adjustment medium TCM1 is increased as the temperature of the first temperature adjustment medium TCM1 is decreased. Since the first temperature adjustment medium TCM1 flows through the electric motor 20 and the power generator 30, a friction loss generated in the electric motor 20 and the power generator 30 is increased, and output efficiencies of the electric motor 20 and the power generator 30 is decreased when the viscosity is increased. Therefore, when the electric motor 20 and the power generator 30 are not at a high temperature at the time of starting the electric motor 20 and the power generator 30 or the like, and the temperature of the first temperature adjustment medium TCM1 is equal to or lower than a predetermined temperature, the first temperature adjustment medium TCM1 does not need to be cooled and it is preferable that the first temperature adjustment medium TCM1 is not cooled.

When the detection value of the temperature of the first temperature adjustment medium TCM1 output from the first temperature sensor 61$a$ is equal to or lower than the predetermined temperature, the control device ECU fully closes the valve device 626 and controls the valve device 626 so as to block the second temperature adjustment medium TCM2 from flowing through the second branch flow path 620$b$2.

When the second temperature adjustment medium TCM2 is blocked from flowing through the second branch flow path 620$b$2, the second temperature adjustment medium TCM2 is not supplied to the heat exchanger 63, and therefore, the heat exchange is not performed between the first temperature adjustment medium TCM1 and the second temperature adjustment medium TCM2, and the first temperature adjustment medium TCM1 is not cooled. Therefore, when the first temperature adjustment medium TCM1 does not need to be cooled, the first temperature adjustment medium TCM1 can be prevented from being cooled by the heat exchanger 63. Accordingly, when the first temperature adjustment medium TCM1 does not need to be cooled, it is possible to prevent the first temperature adjustment medium TCM1 from being cooled by the heat exchanger 63.

When the heat exchanger failure detection unit 71 detects a failure of the heat exchanger 63, the control device ECU controls the internal combustion engine ICE so as to prohibit the driving of the internal combustion engine ICE from being stopped.

When the stop of the driving of the internal combustion engine ICE is prohibited, the internal combustion engine ICE is constantly driven, and the first pump 611 driven by the power of the internal combustion engine ICE is also constantly driven. Therefore, when a failure of the heat exchanger 63 is detected, the first pump 611 is constantly driven, so that the liquid pressure of the first temperature adjustment medium TCM1 which is pressure-fed by the first pump 611 and circulates through the first temperature adjustment circuit 61 is maintained at a predetermined pressure or more. When the heat exchanger 63 fails, the first temperature adjustment medium TCM1 and the second temperature adjustment medium TCM2 easily flow into the flow path whose liquid pressure in the heat exchanger 63 is a low pressure, but since the liquid pressure of the first temperature adjustment medium TCM1 in the heat exchanger 63 is maintained at a predetermined pressure or more, it is possible to reduce mixing of the conductive second temperature adjustment medium TCM2 into the non-conductive first temperature adjustment medium TCM1 due to the second temperature adjustment medium TCM2 flowing into the first temperature adjustment circuit 61 in the heat exchanger 63 even when the heat exchanger 63 fails and is damaged.

Second Embodiment

Next, a vehicle temperature adjustment system 10A according to a second embodiment of the present disclosure will be described with reference to FIG. 4. In the following description, the same components as those of the vehicle temperature adjustment system 10 of the first embodiment are denoted by the same reference numerals, and description thereof will be omitted or simplified.

In the vehicle temperature adjustment system 10 according to the first embodiment, in the second temperature adjustment circuit 62, the valve device 626 is provided upstream of the heat exchanger 63 of the second branch flow path 620b2, that is, between the branching portion 624 and the heat exchanger 63, but in the vehicle temperature adjustment system 10A according to the second embodiment, the valve device 626 may not be provided. In the vehicle temperature adjustment system 10 according to the first embodiment, the second temperature adjustment circuit 62 includes the branching portion 624 and the merging portion 625, and further includes; the first branch flow path 620b1 in which the electric power conversion device 50 is provided, of which an upstream end portion is connected to the branching portion 624, and of which a downstream end portion is connected to the merging portion 625 through the electric power conversion device 50; and the second branch flow path 620b2 in which the heat exchanger 63 is provided, of which an upstream end portion is connected to the branching portion 624, and of which a downstream end portion is connected to the merging portion 625 through the heat exchanger 63, but in the vehicle temperature adjustment system 10A according to the second embodiment, the electric power conversion device 50 and the heat exchanger 63 may be provided in series in the second temperature adjustment circuit 62. Hereinafter, differences between the vehicle temperature adjustment system 10 according to the first embodiment and the vehicle temperature adjustment system 10A according to the second embodiment will be described in detail.

Figure 4:
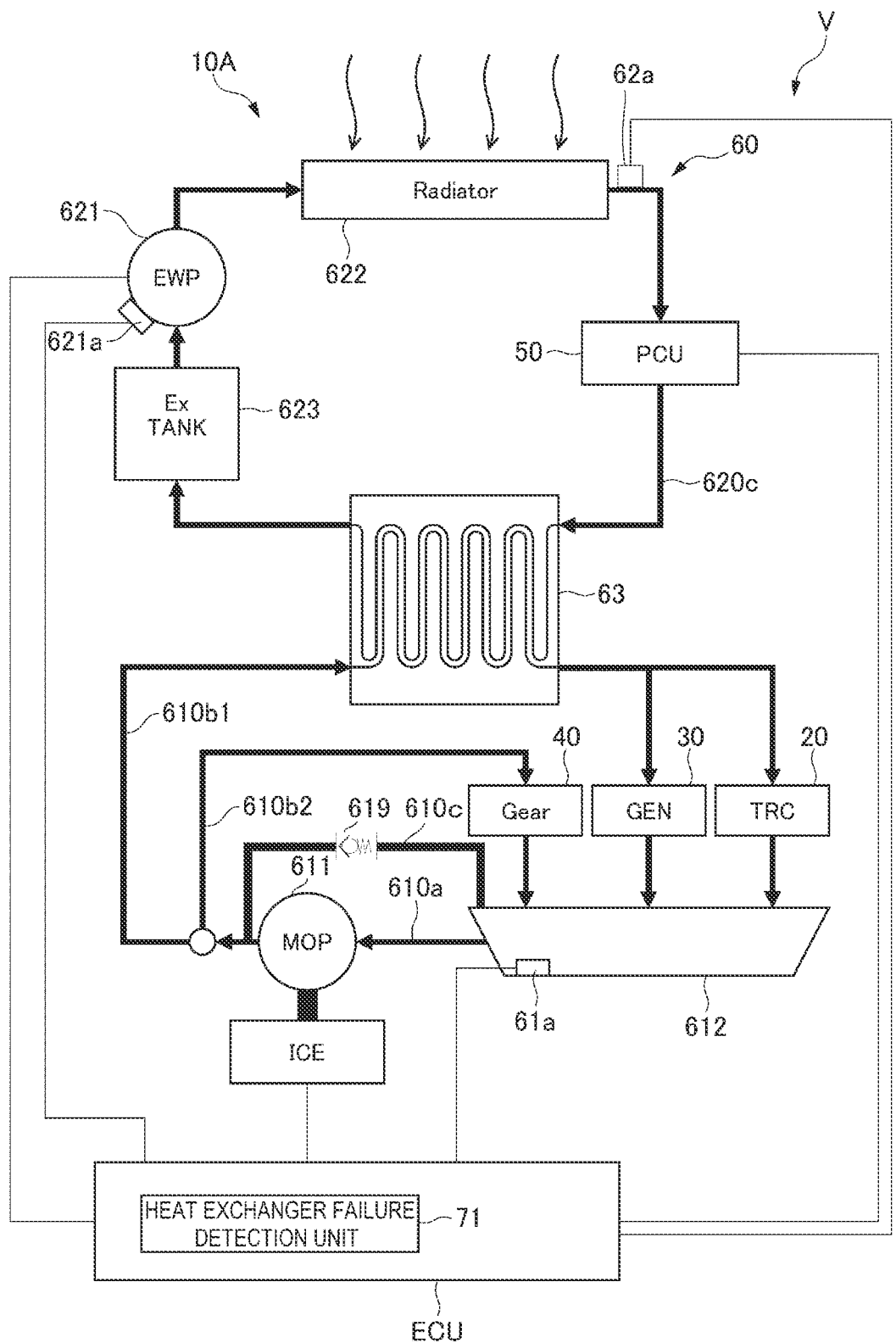
FIG. 4 is a block diagram illustrating a vehicle temperature adjustment system according to a second embodiment of the present disclosure.

As illustrated in FIG. 4, the second temperature adjustment circuit 62 of the present embodiment includes a circulation flow path 620c in which the second pump 621, the radiator 622, the electric power conversion device 50, and the heat exchanger 63 are provided in this order from the upstream side with the storage tank 623 as a starting point, and are formed so as to return to the storage tank 623 again. The second temperature adjustment medium TCM2 flowing through the circulation flow path 620c is discharged from the storage tank 623, is pressure-fed by the second pump 621, is cooled by the radiator 622, is supplied to the electric power conversion device 50, cools the electric power conversion device 50, then is supplied to the heat exchanger 63, exchanges heat with the first temperature adjustment medium TCM1 flowing through the first temperature adjustment circuit 61 in the heat exchanger 63, cools the first temperature adjustment medium TCM1, and returns to the storage tank 623 again. In this way, the second temperature adjustment medium TCM2 circulates through the second temperature adjustment circuit 62.

The control device ECU controls the second pump 621 such that the rotation speed of the second pump 621 when the failure of the heat exchanger 63 is detected is lower than the rotation speed of the second pump 621 when the failure of the heat exchanger 63 is not detected. Therefore, the liquid pressure of the second temperature adjustment medium TCM2 in the heat exchanger 63 when the failure of the heat exchanger 63 is detected is lower than the liquid pressure of the second temperature adjustment medium TCM2 in the heat exchanger 63 when the failure of the heat exchanger 63 is not detected.

When the heat exchanger 63 fails, the first temperature adjustment medium TCM1 and the second temperature adjustment medium TCM2 easily flow into the flow path whose liquid pressure in the heat exchanger 63 is a low pressure, but since the liquid pressure of the second temperature adjustment medium TCM2 in the heat exchanger 63 is decreased, it is possible to reduce mixing of the conductive second temperature adjustment medium TCM2 into the non-conductive first temperature adjustment medium TCM1 due to the second temperature adjustment medium TCM2 flowing into the first temperature adjustment circuit 61 in the heat exchanger 63 even when the heat exchanger 63 fails and is damaged.

Although the embodiments of the present invention have been described above with reference to the accompanying drawings, it is needless to say that the present invention is not limited to the embodiments. It will be apparent to those skilled in the art that various changes and modifications may be conceived within the scope of the claims, it is also understood that the various changes and modifications belong to the technical scope of the present invention. The components in the embodiments described above may be combined freely within a range not departing from the spirit of the invention.

For example, the second temperature adjustment circuit 62 according to the second embodiment includes the circulation flow path 620c in which the second pump 621, the radiator 622, the heat exchanger 63, and the electric power conversion device 50 are provided in this order from the upstream side with the storage tank 623 as a starting point, and are formed so as to return to the storage tank 623 again, but may have the same configuration as the first temperature adjustment circuit 61 according to the first embodiment. That is, the second temperature adjustment circuit 62 according to the second embodiment may include the branching portion 624, the merging portion 625, the pressure feed flow path 620a in which the storage tank 623, the second pump 621, and the radiator 622 are provided in this order from the upstream side and of which an upstream end portion is connected to the merging portion 625 and a downstream end portion is connected to the branching portion 624 through the storage tank 623, the second pump 621, and the radiator 622, the first branching flow path 620b1 in which the electric power conversion device 50 is provided and of which an upstream end portion is connected to the branching portion 624, and a downstream end portion is connected to the merging portion 625 through the electric power conversion device 50, and the second branching flow path 620b2 in which the heat exchanger 63 is provided and of which an upstream end portion is connected to the branching portion 624, and a downstream end portion is connected to the merging portion 625 through the heat exchanger 63.

In addition, for example, although the second temperature adjustment circuit 62 according to the first embodiment and the second embodiment adjusts the temperature of the electric power conversion device 50, a temperature-adjusted device whose temperature is adjusted by the second temperature adjustment circuit 62 may not be the electric power conversion device 50, and may be any device for which temperature adjustment is required.

In the present specification, at least the following matters are described. In the parentheses, the corresponding constituent elements and the like in the above-described embodiment are shown as an example, and the present invention is not limited thereto.

(1) A vehicle temperature adjustment system (vehicle temperature adjustment system 10), including:

a first temperature adjustment circuit (first temperature adjustment circuit 61) through which a first temperature adjustment medium (first temperature adjustment medium TCM1) circulates and in which a first pump (first pump 611) is provided, the first temperature adjustment medium being non-conductive;

a second temperature adjustment circuit (second temperature adjustment circuit 62) through which a second temperature adjustment medium (second temperature adjustment medium TCM2) circulates and in which a second pump (second pump 621) is provided the second temperature adjustment medium being conductive;

a heat exchanger (heat exchanger 63) configured to perform heat exchange between the first temperature adjustment medium and the second temperature adjustment medium; and a control device (control device ECU), in which:

the second temperature adjustment circuit includes:

a branching portion (branching portion 624) and a merging portion (merging portion 625);

a pressure feed flow path (pressure feed flow path 620a) in which the second pump is provided, of which one end portion (downstream end portion) is connected to the branching portion, and of which the other end portion (upstream end portion) is connected to the merging portion;

a first branch flow path (first branch flow path 620b1) in which a temperature-adjusted device (electric power conversion device 50) is provided, of which one end portion (upstream end portion) is connected to the branching portion, and of which the other end portion (downstream end portion) is connected to the merging portion; and a second branch flow path (second branch flow path 620b2) in which the heat exchanger is provided, of which one end portion (upstream end portion) is connected to the branching portion, and of which the other end portion (downstream end portion) of the second branch flow path is connected to the merging portion;

the second temperature adjustment medium pressure-fed by the first pump and flowing through the pressure feed flow path branches and flows into the first branch flow path and the second branch flow path at the branching portion, the second temperature adjustment medium flowing through the first branch flow path and the second temperature adjustment medium flowing through the second branch flow path are merged at the merging portion and flow through the pressure feed flow path to be supplied to the first pump, and the second temperature adjustment medium circulates through the second temperature adjustment circuit;

a valve device (valve device 626) configured to adjust a flow rate of the second temperature adjustment medium flowing through the second branch flow path is provided in the second branch flow path between the branching portion and the heat exchanger; and the control device is configured to control the valve device to block the second temperature adjustment medium from flowing through the second branch flow path when a failure of the heat exchanger is detected.

According to (1), when the failure of the heat exchanger is detected, the control device controls the valve device to block the second temperature adjustment medium from flowing through the second branch flow path, and therefore, the second temperature adjustment medium is not supplied to the heat exchanger when the failure of the heat exchanger is detected. Therefore, even when the heat exchanger fails and is damaged, it is possible to reduce mixing of the conductive second temperature adjustment medium into the non-conductive first temperature adjustment medium due to the second temperature adjustment medium flowing into the first temperature adjustment circuit in the heat exchanger.

(2) The vehicle temperature adjustment system according to (1), in which: in the merging portion, a throttle portion (throttle portion 625a) having a reduced flow path cross-sectional area is formed at the other end portion of the first branch flow path, and the other end portion of the second branch flow path is connected to the first branch flow path by the throttle portion.

According to (2), in the merging portion, the throttle portion having a reduced flow path cross-sectional area is formed at the other end portion of the first branch flow path, and the other end portion of the second branch flow path is connected to the first branch flow path by the throttle portion, so that the flow velocity of the second temperature adjustment medium flowing from the first branch flow path to the pressure feed flow path through the merging portion is increased and the pressure is decreased due to the Venturi effect at the throttle portion having a reduced flow path cross-sectional area. Therefore, in the second temperature adjustment medium flowing through the throttle portion from the first branch flow path to the pressure feed flow path, a suction force for sucking the second temperature adjustment medium flowing through the second branch flow path to the throttle portion is generated. By this suction force, a failure of the heat exchanger is detected, and after the valve device blocks the second temperature adjustment medium from flowing through the second branch flow path by the valve device, the second temperature adjustment medium staying in the heat exchanger is sucked to the throttle portion and is guided to the merging portion. Accordingly, a failure of the heat exchanger is detected, and it is possible to reduce the second temperature adjustment medium staying in the heat exchanger after the valve device blocks the second temperature adjustment medium from flowing through the second branch flow path, and thus it is possible to further reduce the mixing of the conductive second temperature adjustment medium into the non-conductive first temperature adjustment medium due to the second temperature adjustment medium flowing into the first temperature adjustment circuit in the heat exchanger.

(3) A vehicle temperature adjustment system (vehicle temperature adjustment system 10), including:

an internal combustion engine (internal combustion engine ICE);

a first temperature adjustment circuit (first temperature adjustment circuit 61) through which a first temperature adjustment medium (first temperature adjustment medium TCM1) circulates and in which a first pump (first pump 611) is provided, the first temperature adjustment medium being non-conductive;

a second temperature adjustment circuit (second temperature adjustment circuit 62) through which a second temperature adjustment medium (second temperature adjustment medium TCM2) circulates and in which a second pump (second pump 621) is provided, the second temperature adjustment medium being conductive;

a heat exchanger (heat exchanger 63) configured to perform heat exchange between the first temperature adjustment medium and the second temperature adjustment medium; and a control device (control device ECU), in which:

the first pump is driven by power of the internal combustion engine; and the control device is configured to control the internal combustion engine to prohibit the driving of the internal combustion engine from being stopped when a failure of the heat exchanger is detected.

According to (3), when the failure of the heat exchanger is detected, the control device controls the internal combustion engine to prohibit the driving of the internal combustion engine from being stopped, and therefore, when the failure of the heat exchanger is detected, the first pump is constantly driven, and the liquid pressure of the first temperature adjustment medium that is pressure-fed by the first pump and circulates through the first temperature adjustment circuit is maintained at a predetermined pressure or more. Accordingly, even when the heat exchanger fails and is damaged, it is possible to reduce mixing of the conductive second temperature adjustment medium into the non-conductive first temperature adjustment medium due to the second temperature adjustment medium flowing into the first temperature adjustment circuit in the heat exchanger.

(4) A vehicle temperature adjustment system (vehicle temperature adjustment system 10), including:

a first temperature adjustment circuit (first temperature adjustment circuit 61) through which a first temperature adjustment medium (first temperature adjustment medium TCM1) circulates and in which a first pump (first pump 611) is provided, the first temperature adjustment medium being non-conductive;

a second temperature adjustment circuit (second temperature adjustment circuit 62) through which a second temperature adjustment medium (second temperature adjustment medium TCM2) circulates and in which a second pump (second pump 621) is provided, the second temperature adjustment medium being conductive;

a heat exchanger (heat exchanger 63) configured to perform heat exchange between the first temperature adjustment medium and the second temperature adjustment medium; and a control device (control device ECU), in which:

the second pump is an electric pump configured to be controlled by the control device; and the control device is configured to control the second pump such that a rotation speed of the second pump when a failure of the heat exchanger is detected is lower than a rotation speed of the second pump when a failure of the heat exchanger is not detected.

According to (4), since the control device controls the second pump such that the rotation speed of the second pump when a failure of the heat exchanger is detected is lower than the rotation speed of the second pump when a failure of the heat exchanger is not detected, the liquid pressure of the second temperature adjusting medium in the heat exchanger when a failure of the heat exchanger is detected is lower than the liquid pressure of the second temperature adjusting medium in the heat exchanger when no failure of the heat exchanger is detected. Accordingly, even when the heat exchanger fails and is damaged, it is possible to reduce mixing of the conductive second temperature adjustment medium into the non-conductive first temperature adjustment medium due to the second temperature adjustment medium flowing into the first temperature adjustment circuit in the heat exchanger.

(5) The vehicle temperature adjustment system according to any one of (1) to (4), in which:

the second pump is an electric pump; and the control device is configured to detect a failure of the heat exchanger based on a change in the rotation speed of the second pump.

According to (5), since the control device is configured to detect the failure of the heat exchanger based on the change in the rotation speed of the second pump, it is possible to detect the failure of the heat exchanger with a simple configuration, and it is possible to reduce the size of the vehicle temperature adjustment system.

What is claimed is:

1. A vehicle temperature adjustment system, comprising:
a first temperature adjustment circuit through which a first temperature adjustment medium circulates and in which a first pump is provided, the first temperature adjustment medium being non-conductive;
a second temperature adjustment circuit through which a second temperature adjustment medium circulates and in which a second pump is provided, the second temperature adjustment medium being conductive;
a heat exchanger configured to perform heat exchange between the first temperature adjustment medium and the second temperature adjustment medium; and
a control device, wherein:
the second temperature adjustment circuit includes:
a branching portion and a merging portion;
a pressure feed flow path in which the second pump is provided, of which one end portion is connected to the branching portion, and of which the other end portion is connected to the merging portion;
a first branch flow path in which a temperature-adjusted device is provided, of which one end portion is connected to the branching portion, and of which the other end portion is connected to the merging portion; and
a second branch flow path in which the heat exchanger is provided, of which one end portion is connected to the branching portion, and of which the other end portion is connected to the merging portion;
the second temperature adjustment medium pressure-fed by the second pump and flowing through the pressure feed flow path branches and flows into the first branch flow path and the second branch flow path at the branching portion, the second temperature adjustment medium flowing through the first branch flow path and the second temperature adjustment medium flowing through the second branch flow path are merged at the merging portion and flow through the pressure feed flow path to be supplied to the second pump, and the second temperature adjustment medium circulates through the second temperature adjustment circuit;
a valve device configured to adjust a flow rate of the second temperature adjustment medium flowing through the second branch flow path is provided in the second branch flow path between the branching portion and the heat exchanger;
the control device includes a heat exchanger failure detection unit configured to detect a failure of the heat exchanger; and
the control device is configured to control the valve device to block the second temperature adjustment medium from flowing through the second branch flow path when the failure of the heat exchanger is detected by the heat exchanger failure detection unit.

2. The vehicle temperature adjustment system according to claim 1, wherein:
in the merging portion, a throttle portion having a reduced flow path cross-sectional area is formed at the other end portion of the first branch flow path, and the other end portion of the second branch flow path is connected to the first branch flow path by the throttle portion.

3. A vehicle temperature adjustment system, comprising:
an internal combustion engine;
a first temperature adjustment circuit through which a first temperature adjustment medium circulates and in which a first pump is provided, the first temperature adjustment medium being non-conductive;
a second temperature adjustment circuit through which a second temperature adjustment medium circulates and in which a second pump is provided, the second temperature adjustment medium being conductive;
a heat exchanger configured to perform heat exchange between the first temperature adjustment medium and the second temperature adjustment medium; and
a control device, wherein:
the first pump is driven by power of the internal combustion engine;
the control device includes a heat exchanger failure detection unit configured to detect a failure of the heat exchanger; and
the control device is configured to control the internal combustion engine to prohibit the driving of the internal combustion engine from being stopped when the failure of the heat exchanger is detected by the heat exchanger failure detection unit.

4. A vehicle temperature adjustment system, comprising:
a first temperature adjustment circuit through which a first temperature adjustment medium circulates and in which a first pump is provided, the first temperature adjustment medium being non-conductive;
a second temperature adjustment circuit through which a second temperature adjustment medium circulates and in which a second pump is provided, the second temperature adjustment medium being conductive;
a heat exchanger configured to perform heat exchange between the first temperature adjustment medium and the second temperature adjustment medium; and
a control device, wherein:
the second pump is an electric pump configured to be controlled by the control device;
the control device includes a heat exchanger failure detection unit configured to detect a failure of the heat exchanger; and
the control device is configured to control the second pump such that a rotation speed of the second pump when the failure of the heat exchanger is detected by the heat exchanger failure detection unit is lower than a rotation speed of the second pump when failure of the heat exchanger is not detected by the heat exchanger failure detection unit.

5. The vehicle temperature adjustment system according to claim 1, wherein:
the second pump is an electric pump; and
the control device is configured to detect the failure of the heat exchanger based on a change in the rotation speed of the second pump.

* * * * *